United States Patent
George

[11] Patent Number: 5,815,979
[45] Date of Patent: Oct. 6, 1998

[54] FLY FISHING SHOCK TIPPET STRAIGHTENING DEVICE

[76] Inventor: Allan E. George, 5020 Thornhill Rd., Dublin, Ohio 43017

[21] Appl. No.: 720,119

[22] Filed: Sep. 27, 1996

[51] Int. Cl.[6] .................................................. A01K 97/06
[52] U.S. Cl. ............................................................. 43/57.2
[58] Field of Search ................................... 45/57.2, 57.1, 45/54.1; 206/315.11

[56] References Cited

U.S. PATENT DOCUMENTS

| | | | |
|---|---|---|---|
| 2,836,005 | 5/1958 | Jerdee | 43/57.2 |
| 3,053,006 | 9/1962 | Horner | 43/57.2 |
| 3,564,755 | 2/1971 | Lindgren, Sr. | 43/57.2 |
| 4,040,202 | 8/1977 | Wille | 43/57.2 |
| 4,577,433 | 3/1986 | Jones | 43/57.2 |
| 4,631,856 | 12/1986 | Born | 43/57.2 |
| 4,691,471 | 9/1987 | Hansen | 43/57.2 |
| 4,924,621 | 5/1990 | Hawranik et al. | 43/57.2 |
| 5,157,862 | 10/1992 | Companiony | 43/57.2 |
| 5,269,090 | 12/1993 | Richards et al. | 43/57.2 |
| 5,386,662 | 2/1995 | Vader et al. | 43/57.2 |

*Primary Examiner*—Daniel D. Wasil
*Attorney, Agent, or Firm*—John L. Gray; Kegler, Brown, Hill & Ritter

[57] ABSTRACT

A fishing leader straightening device comprising compression spring loaded rods to hold the hook attached to one end of a shock tippet and slots to receive the knotted ends of the shock tippet to enable the shock tippet to be straightened. The base member may be provided with suction cups so that it may be held on the deck of a fishing boat.

5 Claims, 2 Drawing Sheets

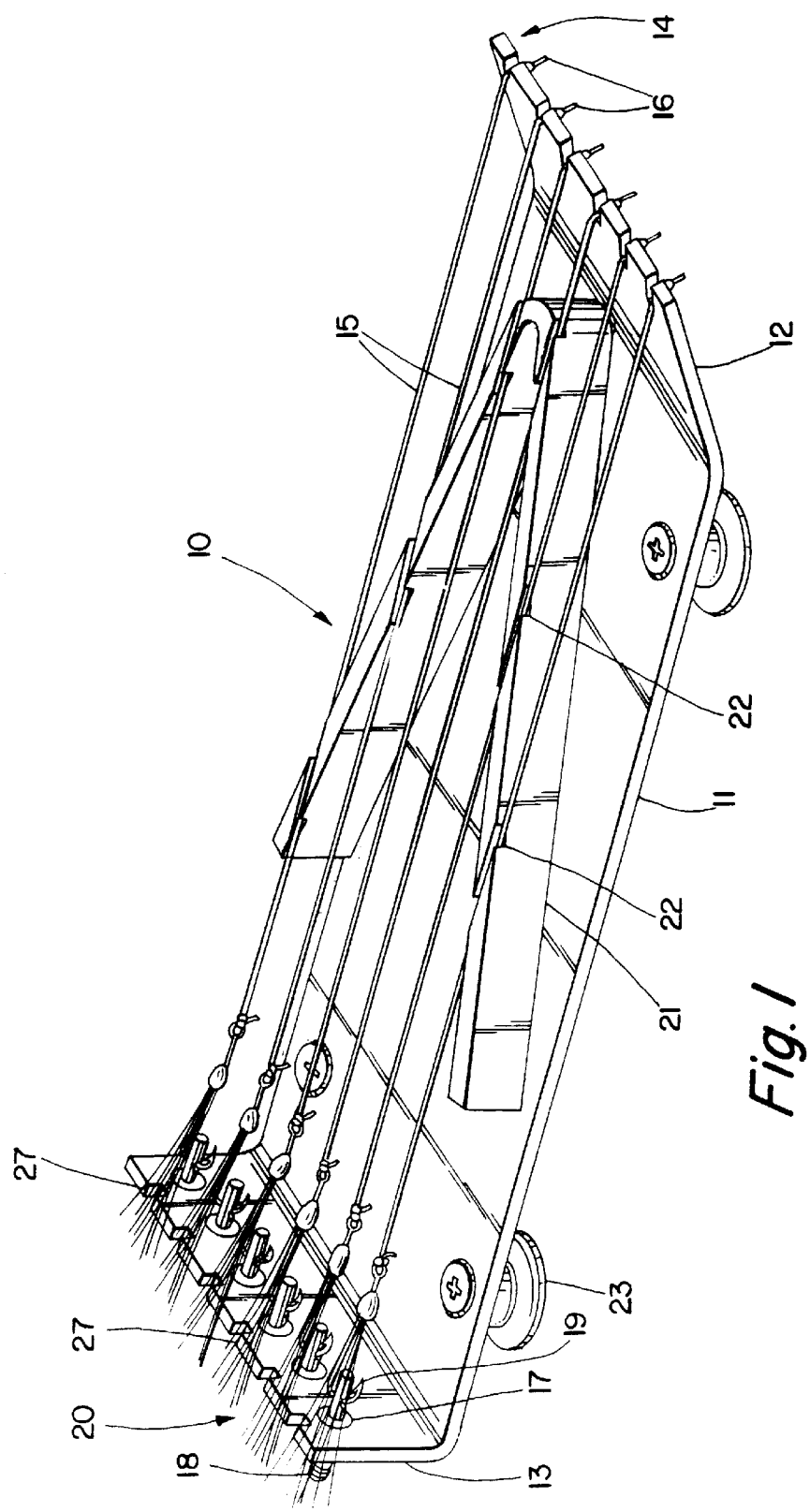

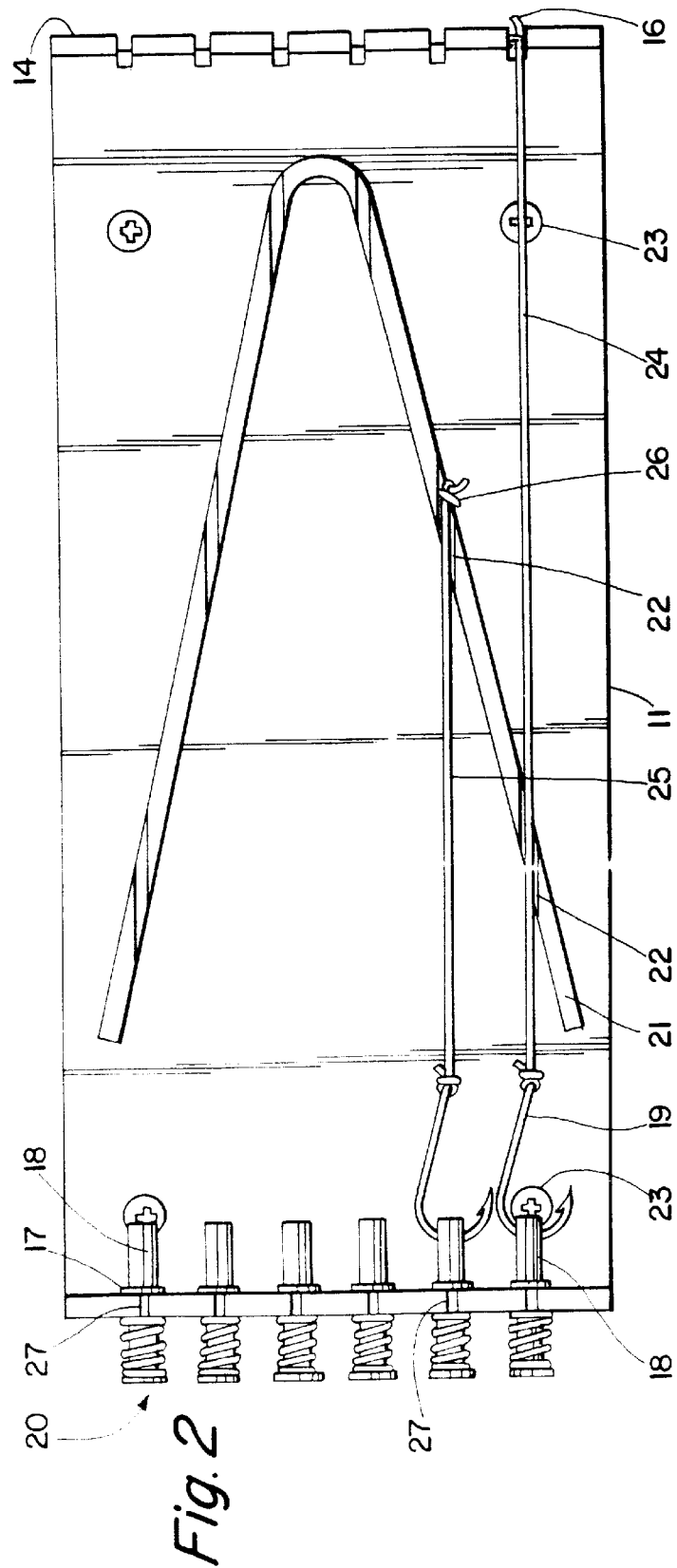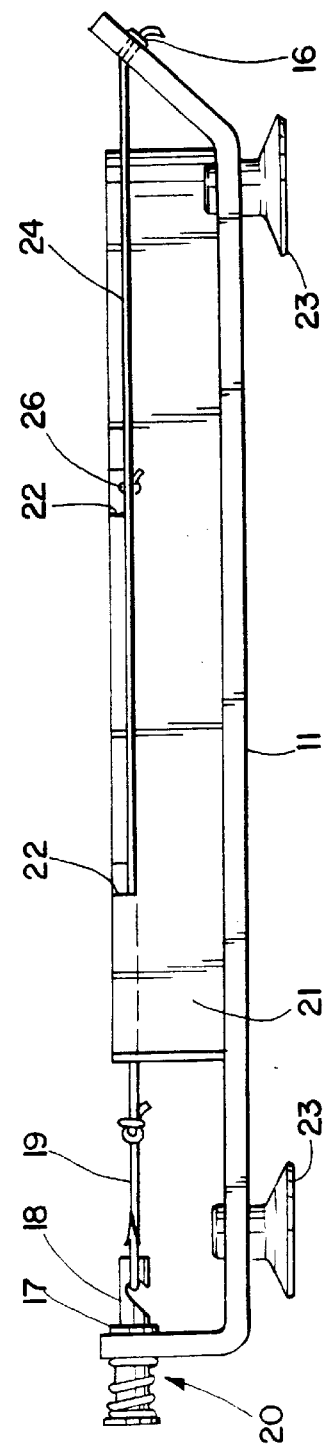

FLY FISHING SHOCK TIPPET STRAIGHTENING DEVICE

BACKGROUND OF THE INVENTION

The shock tippets used to hold fish hooks and lures for salt water fly fishing are available to fishermen in continuous lengths on a spool. When the fisherman cuts off a length, usually about 16 inches, the shock tippet has a memory and it is essential in fishing that the shock tippet not be coiled as a result of the memory. Therefore, it is necessary to straighten the shock tippet out to eliminate the memory. While there are many devices to hold fish hooks and shock tippets, there are none designed to effect a straightening of the shock tippet.

SUMMARY OF THE INVENTION

The invention of applicant provides a device which may be used to straighten such shock tippets when it has been attached to a fish hook. The shock tippet and the hook may be installed on the device and removed therefrom with the fisherman just utilizing one hand. The device may also be readily secured to the top surface of a fishing boat, which is usually made of fiberglass, so that it is readily accessible to the fisherman.

It is therefore an object of the invention to provide a fishing shock tippet straightening device which is easy to use.

It is a further object of this invention to provide such a straightening device that may be used with various lengths of shock tippets at the owner's option.

It is still a further object of this invention to provide such a shock tippet straightening device which may be readily attached to the top surface of a fishing boat.

These, together with other objects and advantages of the invention will become more readily apparent to those skilled in the art when the following statements and general descriptions have been read in light of the appended drawings.

BRIEF DESCRIPTION OF THE DRAWINGS

FIG. 1 is a perspective view of the fishing shock tippet straightening device showing hooks and shock tippets position thereon.

FIG. 2 is a plan view of the fishing shock tippet straightening device showing shock tippets held at different lengths on the device.

FIG. 3 is a side elevation view of FIG. 2.

DETAILED DESCRIPTION OF THE INVENTION

Referring now to FIG. 1, the fishing shock tippet straightening device is shown generally at 10. It comprises a base member 11 which has upstanding ends 12 and 13. End 12 is provided with a plurality of slots 14—14 of a size adapted to receive shock tippets 15—15 and retain them therein with the end of the shock tippets 15—15 knotted at 16—16. The upstanding end 13 is provided with a series of holes 17—17 which contain rods 18—18 which are held in place in end 13 and also cause tension on shock tippets 15—15 when engaged by the hooks 19—19 on shock tippets 15—15 by means of progressive rate compression springs 20—20.

Additional slots 27—27 are positioned above rods 18—18 so that the class tippets (not shown) may be wound under the base member 11, through the slots 27—27 and thence back through the slots 14—14.

There is also positioned on the base member 11 a V shaped member 21 which could have a series of slots 22—22 placed thereon at the owner's option to receive shorter length shock tippets. This also functions as a holding tray for small objects such as snippers, files, etc. when the device is horizontally mounted.

The base member 11 is provided on the bottom thereof with a plurality of suction cups 23—23 for fastening to the top surface of a fishing boat.

Referring now more particularly to FIG. 2, two shock tippets 24 and 25 being stretched are shown. One is a longer shock tippet, 24, which is held in place on the base 11 in the same manner as is shown in FIG. 1. There is also a shorter shock tippet 25 which is held in slot 22 of member 21 by means of knot 26.

FIG. 3 is a side elevation view of FIG. 2 showing the manner in which the two shock tippets are held. In operation the shock tippets would be attached by the hooks 19 to the rods 18. The base itself, because of its slight flexibility, will tend also to provide a certain amount of tension on the shock tippet.

The length of time that it is necessary to have the shock tippet in the fishing shock tippet straightening device will depend upon the material from which the tippet is made and the ambient temperature.

While this invention has been described in its preferred embodiment, it is to be appreciated that variations may be made therefrom without departing from the true scope and spirit of the invention.

What is claimed is:

1. A fly fishing line leader shock tippet straightening device comprising:

a base member having a flat portion provided with two oppositely disposed upstanding ends, one of said ends being provided with a plurality of slots therein of a size to hold and retain a shock tippet having a knotted end, the other of said ends being provided with a plurality of rods, each of said rods being located opposite each of said slots in said one end and each of said rods being provided with a slot extending therethrough and of a size so as to be able to receive and retain a fish hook therein which hook is attached to the end of a shock tippet opposite said knotted end, each of said rods being confined to limited movement by a spring.

2. The fishing shock tippet straightening device of claim 1 wherein said flat portion of said base member is slightly depressed between the two oppositely deposed upstanding ends.

3. The fishing shock tippet straightening device of claim 1 wherein the said base member is provided with additional slots thereon intermediate the two oppositely disposed upstanding ends, said slots being of a size to hold and retain a fishing shock tippet having a knotted end.

4. The fishing shock tippet straightening device of claim 1 wherein said other end is provided with a slot above each of said rods adapted to hold class tippets.

5. The fishing shock tippet straightening device of claim 1 wherein said base member is provided on the underside thereof with a plurality of suction cups.

* * * * *